March 11, 1969   J. R. BASHOR   3,431,799
CHIP BREAKER
Filed May 25, 1966
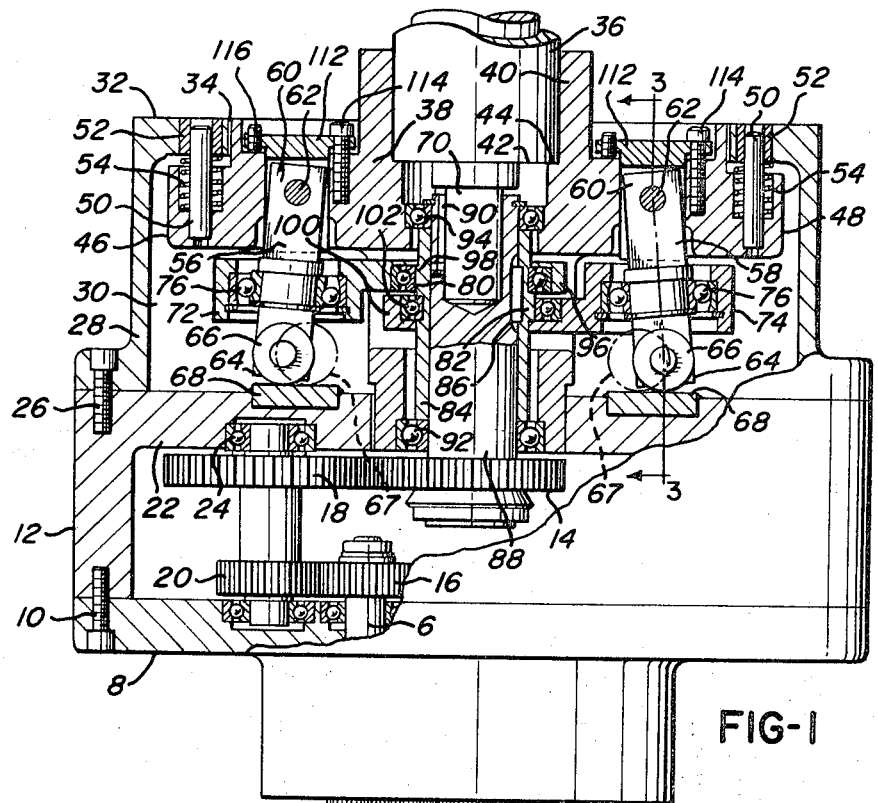
FIG-1
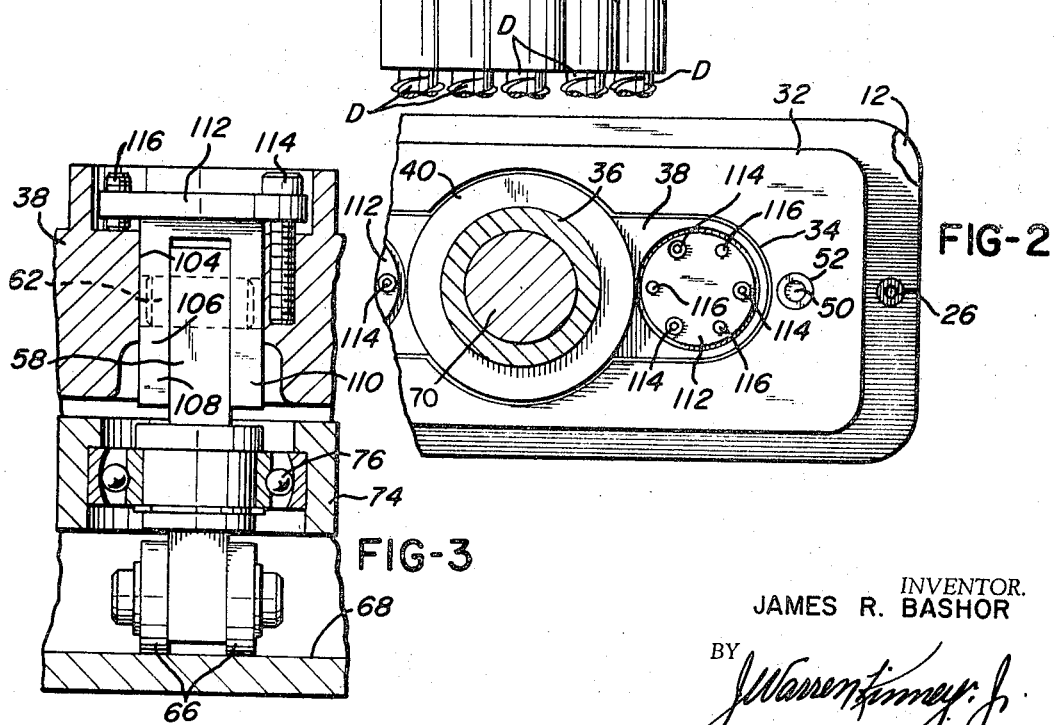
FIG-2
FIG-3
INVENTOR.
JAMES R. BASHOR
BY
J. Warren Kinney Jr.
ATTORNEY

United States Patent Office 3,431,799
Patented Mar. 11, 1969

3,431,799
CHIP BREAKER
James R. Bashor, Cincinnati, Ohio, assignor to United States Drill Head Company, Cincinnati, Ohio, a corporation of Ohio
Filed May 25, 1966, Ser. No. 552,824
U.S. Cl. 77—32.3
Int. Cl. B23b 47/22, 47/34, 39/16
12 Claims

ABSTRACT OF THE DISCLOSURE

The drill head is of the multiple-spindle type, and includes chip-breaking means suited to the heavy duty service demanded as the result of drilling many holes simultaneously. The entire drill head housing with its multiplicity of spindles and drills, is yieldingly suspended bodily from the reciprocable nonrotatable drive spindle sleeve or quill, with support from a pair of laterally rockable thrust bars which depend from pivots that move with said sleeve or quill, the thrust bars having swingable ends to traverse thrust pads fixed within the head housing. The thrust bars are swung toward and from the spindle axis by means of cams rotatable with the spindle, and may be adjusted at their pivots toward and from the thrust pads to vary the extent to which the thrust bars vibrate the head housing lengthwise of the drive spindle.

---

The present invention relates to an automatic chip-breaking drill head, the primary purpose of which is to prevent the formation of long curls of metal usually produced when drilling holes in a metallic workpiece.

The formation of long spiral curls or chips resulting from the drilling of holes in metal, constitutes a hazard and a nuisance when the curls accumulate upon a workpiece and become entangled about the rotating drills. Such curls as remain unbroken are difficult to dispose of during the drilling operation, because they often spin about and may lacerate the hands or tear the clothing of the drill operator.

An object of the present invention is to prevent the formation of long curls or chips during the drilling of holes in a workpiece.

Another object of the invention is to provide means operative automatically in the course of a drilling operation, for breaking the chips or curls into short sections which easily may be swept from the the workpiece without danger to the hands or the apparel of the drill operator.

A further object of the invention is to enhance the performance of metal-cutting drills by intermittently relieving the drilling pressure and encouraging flow of lubricant into the drill hole, while at the same time breaking the curls or chips into short sections.

Another object is to provide simple, durable, and effective automatic means for disintegrating long curls or chips of metal, said means being built into the drill head for self-lubrication.

A further object of the invention is to provide for adjustability of the curl or chip disintegrating means in order to accommodate same to the cutting of metals differing in ductility, grade, or composition, and the rate of drill feed.

Another object is to extend the useful life of the drills and their cutting edges, and to enhance the accuracy of the drilling operation.

The foregoing and other objects are attained by the means described herein and illustrated upon the accompanying drawing, in which:

FIG. 1 is a side elevational view partly in cross-section, of a drill head embodying the present invention.

FIG. 2 is a fragmentary top view of the same.

FIG. 3 is an enlarged cross-section taken on line 3—3 of FIG. 1.

In the drawing, a gang of drills is indicated by the reference characters D, the drills being usually in spaced parallelism with one another and rotatable in a common direction. Each drill is driven by a spindle shaft such as 6 suitably journalled in a housing end plate 8. End plate 8 may be secured by means of screws 10 to the gear housing 12 which encases a planetary system of gears whereby all of the drill spindles are driven from a main driving gear 14. In the example illustrated, a drill spindle gear 16 is driven by main driving gear 14 through the agency of intermediate meshed gears 18 and 20. Gear housing 12 includes a heavy transverse wall or back member 22 which supports the bearings 24 of the transmission gearing.

The structure above recited is conventional and is subject to various modifications, particularly as concerns the number and type of drill spindles and transmission gears employed.

Upon the housing 12 is fixedly mounted, as by means of screws 26, a rigid housing cover 28 providing a chamber 30. Housing cover 28 includes an end wall 32 having an enlarged opening 34 extending across said end wall equal distances from the center-line of drive spindle sleeve 36. Sleeve 36, which is nonrotatable but subject to longitudinal feed advancement, carries a thrust head 38 which is movable with the spindle sleeve. A central bored boss 40 on head 38 snugly accommodates the spindle sleeve and is fixedly secured thereto in any suitable manner. The lower end 42 of sleeve 36 abuts an interior shoulder 44 of boss 40 so as to transmit longitudinal feed movement of the spindle sleeve to thrust head 38.

Thrust head 38 has opposite end portions 46 and 48 which underlie the end wall 32 of housing cover 28 within chamber 30 and connection is effected between end wall 32 and the opposite ends 46 and 48 of the thrust head by means of guide pins 50, 50. Each guide pin may be fixed at its lower end to the thrust head and extends upwardly for longitudinal sliding movement in a bushing 52 fixed within the end wall 32 of cover 28. Heavy compression springs 54 surrounding the guide pins yieldingly urge the cover wall 32 upwardly away from the end portions 46, 48 of thrust head 38.

Cushion springs 54 are held under compression by means of thrust bars 56 and 58, which at their upper ends 60, are pendent from heavy pivots 62. The pivots are, in effect, fixed relative to thrust head 38, through the agency of means to be later described. The lower or free ends 64 of the thrust bars carry rollers 66 which bear upon hardened thrust pads 68 welded or otherwise fixed upon the transverse wall 22 of gear housing 12. The thrust bars 56 and 58 are swingable to a limited extent about their pivots 62, causing the rollers 66 to traverse the pads 68 in a vertical plane. Swinging of the thrust bars about their pivots 62 shifts the rollers 66 from the full-line position of FIG. 1 to the broken line position indicated by 67.

From the foregoing, it will be understood that swinging of the thrust bars in unison between the two positions indicated will produce alternate lowering and elevating movements of housing 12 and the drills carried thereby, relative to thrust head 38. Since in normal operation the thrust head is advanced uniformly downwardly by the feed of drive spindle 36, the housing parts 12, 28, 8, and the drills D will at the same time reciprocate axially of spindle 36. The reciprocative movement mentioned is slight, but sufficient to interrupt the cutting action of the drills to the extent that chips or curls produced by the drills in boring a workpiece will be broken into short sections. That is, the drilling will be performed intermittently, rather than continuously, notwithstanding a steady feed advancement of spindle sleeve 36.

Means are provided for swinging the thrust bars 56 and 58 about their pivots 62, as the drive spindle 70 advances continuously and rotates to drive the several drills D through the intermediary of gears 14, 18, 20 and 16. Such means may comprise eccentrics 72 and 74 connected, respectively, to the swingable thrust bars 56 and 58. The connection between each eccentric and its cooperative thrust bar may include an antifriction bearing 76 to minimize wear.

The eccentrics are caused to move in a substantially straight line radially of spindle 70 for rocking the thrust bars by the action of annular cams 80 and 82 formed on the outer cylindrical face of a sleeve 84 keyed as at 86 to the spindle extension shaft 88. Shaft 88 carries the main drive gear 14, and is keyed at 90 to the lower end of drive spindle 36. The assembly comprising the spindle extension shaft 88, gear 14, and the sleeve 84 carrying the cams 80 and 82 is rotatable with drive spindle 70, and may be supported for rotation within the central, upright bore of thrust head 38 by means of antifriction bearings 92 and 94. Thrust head 38, as previously stated, is nonrotatable by reason of fixation upon spindle sleeve 36 which is reciprocable but not rotatable.

Eccentric 72 is provided with an annular end or head 96 which surrounds cam 80, and to minimize wear an antifriction bearing 98 may be incorporated in the structure. Similarly, eccentric 74 has an annular end or head 100 surrounding cam 82 with an interposed antifriction bearing 102 minimizing cam wear. The cams 80 and 82 are circular with their centers offset from the axis of spindle extension shaft 88, so as to impart throw of the cams to their respective eccentrics and the thrust bars 56, 58 associated therewith. The high points or toes of cams 80 and 82 preferably are disposed at 180 degree angularity to one another, or at opposite sides of the axis of shaft 88 so that the eccentrics are moved simultaneously in opposite directions as cam sleeve 84 rotates.

From the foregoing, it will be understood that rotation of drive spindle 70 and the cam sleeve 84 fixed thereto effects simultaneous outward rocking of thrust bars 56 and 58 about their respective pivots 62, 62, followed by an inward displacement to the broken line positions 67, 67. That is, the rollers 66 will traverse the thrust pads 68 between the two indicated limits denoted by full lines 66 and broken lines 67 as cams 80 and 82 drive the eccentrics simultaneously in opposite directions outwardly then inwardly with respect to the drive spindle axis.

As was previously mentioned herein, the pivots 62 which suspend the thrust bars 56 and 58 are normally fixed relative to thrust head 38; however, provision is made for adjusting the elevation of the pivots, as follows. As best shown in FIG. 3, the thrust head 38 may be vertically apertured to provide a rectangular hole 104 receptive of a clevis 106, the spaced arms 108 and 110 of which loosely embrace the pivoted end of a thrust bar such as 58. Opposite ends of pivot pin 62 may be anchored in clevis arms 108 and 110, as shown.

The clevis arms may depend from a saddle 112, which saddle may be integral with the clevis arms. A screw 114 passes loosely through an opening in the saddle, and secures the saddle to thrust head 38. Another screw 116 has threaded connection with a tapped hole in the saddle, and the leading end of said screw 116 bears upon the top of thrust head 38 to space the saddle from the upper surface of the thrust head. Screw 116 performs as a jack screw to establish a desired elevation of clevis 106 and the pivot pin 62 anchored therein.

As best illustrated by FIG. 2, saddle 112 is fixed upon thrust head 38 by a plurality of screws 114 and 116 arranged in a circle with jack screws 116 alternated with the anchor screws 114. With this arrangement, the jack screws 116 may be used for establishing a desired elevation of the clevis and pivot pin 62, and screws 114 may be then tightened to lock the jack screws in the adjusted position and thereby fix the elevation of the pivot pin upon thrust head 38.

By adjusting the clevises for the thrust arms 56 and 58 as above explained, vibratory action of the head carrying the drills D may be varied to compensate for different variables encountered in performing various drilling operations. Depending upon the nature of the workpiece, the drilling speed permissible thereon, or other governing factors, chip-breaking may be accomplished with various degrees of effectiveness by adjusting the elevation of the thrust bar pivots 62.

In some instances, the adjustability feature of the thrust arms may be omitted, thereby simplifying the mounting of pivot pins 62 by anchoring them nonadjustably upon the thrust head.

The center-line of a pivot pin 62 may be located in a plane which stands perpendicularly at a central point on pad 68; or if desired, said pivot pin may be located to one side of the perpendicular plane. Also, the throw of a cam such as 80 might be gauged to move thrust bar 56 to and from a perpendicular position, or alternatively, past or beyond a dead-center position with respect to pad 68. If the thrust bar is activated to move to opposite sides of a dead-center position with each cycle of operation, the chip-breaking activity of the drill head will of course be doubled. Whether or not the thrust bar is to be moved past dead-center with each full rotation of the drill spindle is a matter of discretion on the part of the machine designer or builder.

It is to be understood that various modifications and changes may be made in the structural details of the apparatus, within the scope of the appended claims, without departing from the spirit of the invention.

What is claimed is:

1. A drill head for application to the rotary drive spindle and the nonrotatable feedable spindle sleeve of a drilling machine, comprising in combination: a drill head housing for supporting a rotary twist drill, and means imparting rotation of the drive spindle to said drill; means yieldingly suspending the drill head housing from the spindle sleeve; means for transmitting feed motion of the spindle to said drill head housing through said yielding suspension, for advancing the drill relative to a workpiece; and means operative periodically during rotation of the drill, for alternately elevating and lowering the drill head housing relative to said spindle sleeve with accompanying variations in the force of said yielding means for intermittently varying the rate of feed of the drill into the workpiece, thereby to intermittently disrupt uniformity in the thickness of curls produced by the drill penetrating the material of the workpiece.

2. The drill head as specified by claim 1, wherein the periodically operative means is activated by the rotary drive spindle of the drilling machine.

3. The drill head as specified by claim 2, wherein actuation of the periodically operative means is independent of the rate of feed of the spindle sleeve.

4. The drill head as specified by claim 2, wherein the aforesaid means driven by the rotary drive spindle and said periodically operative means, includes: cam means rotatable with the rotary drive spindle; a pair of eccentrics shiftable by said cam means in opposite directions perpendicularly to the axis of rotation of said drive spindle; and a pair of elongated thrust bars each having opposite ends; means pivotally suspending one end of each thrust bar for movement bodily with the spindle sleeve; a roller on the opposite swingable end of each thrust bar in striking relationship with the reciprocable housing; and means transmitting movements of the eccentrics to said thrust bars, for delivering impacts of the thrust bar rollers to said housing and shifting said housing axially of the spindle sleeve.

5. The drill head as specified by claim 4, wherein is included means for adjusting the elevation of each thrust bar pivot means lengthwise of the spindle sleeve axis.

6. An automatic chip-breaking drill head for application to the rotary drive spindle and the nonrotatable feedable spindle sleeve of a drilling machine, comprising in combination: a hollow drill head housing including upper and lower transverse walls, said upper wall having an enlarged central opening therein; means on the lower wall for supporting at least one rotatable twist drill; means for imparting rotation of the drive spindle to said drill; a substantially horizontal thrust head having a vertically bored central portion, and opposite end portions, said end portions being located within the housing to underlie the housing upper wall, yielding means disposed between said upper wall and the end portions of thrust head, for maintaining a variable space therebetween; means at the central portion of the thrust head fixedly securing said thrust head to the spindle sleeve for movement therewith axially of the spindle sleeve; and vibratory means within the hollow housing driven by said rotary drive spindle, for reciprocating said housing relative to the thrust head and axially of the drive spindle, during steady linear feeding of the spindle sleeve and rotational movement of the drive spindle.

7. The drill head as specified by claim 6, wherein the combination includes: means to adjust the intensity with which the vibratory means reciprocates the housing and the drill carried thereby.

8. The drill head as specified by claim 6, wherein the hollow housing includes a transverse interior wall intermediate the upper and lower walls thereof, and wherein the vibratory means directs impacts upon said interior wall to reciprocate the housing relative to the thrust head.

9. The drill head as specified by claim 6, wherein the hollow housing includes a pair of rigid interior abutments intermediate the upper and lower walls of the housing and the vibratory means includes cam means rotatable with the drive spindle; a pair of elongate thrust bars located at opposite sides of the drive spindle, said thrust bars each having an upper end and a lower end; pivot means on the thrust head for suspending the thrust bars from their upper ends, with the lower ends of the thrust bars in position to contact the rigid abutments; and means transmitting motion of the cam means to the thrust bars, for rocking the thrust bars upon their pivots while the lower ends of the thrust bars strike and move the abutments and the hollow housing associated with said abutments.

10. The drill head as specified by claim 9, wherein the yielding means aforesaid maintains the abutments of the housing in contact with the lower ends of the thrust bars, as said bars are rocked about their respective pivots.

11. The drill head as specified by claim 10, wherein the combination includes: means for adjusting the elevation of the thrust bar pivots upon the thrust head, along a line parallel to the drive spindle axis.

12. The drill head as specified by claim 9, wherein the combination includes: means for adjusting the position of the thrust bar pivots upon the thrust head.

References Cited
UNITED STATES PATENTS

| | | | |
|---|---|---|---|
| 2,457,795 | 12/1948 | Taylor | 77—32.3 |
| 2,562,040 | 7/1951 | Karweit | 77—32.3 |
| 2,453,136 | 11/1948 | Karweit | 77—32.3 |

FRANCIS S. HUSAR, *Primary Examiner.*

U.S. Cl. X.R.

77—22